June 2, 1964     F. S. SADLER     3,135,627
THERMALLY STABILIZED CELLULOSE MATERIALS
FOR ELECTRICAL INSULATION
Filed Aug. 8, 1961
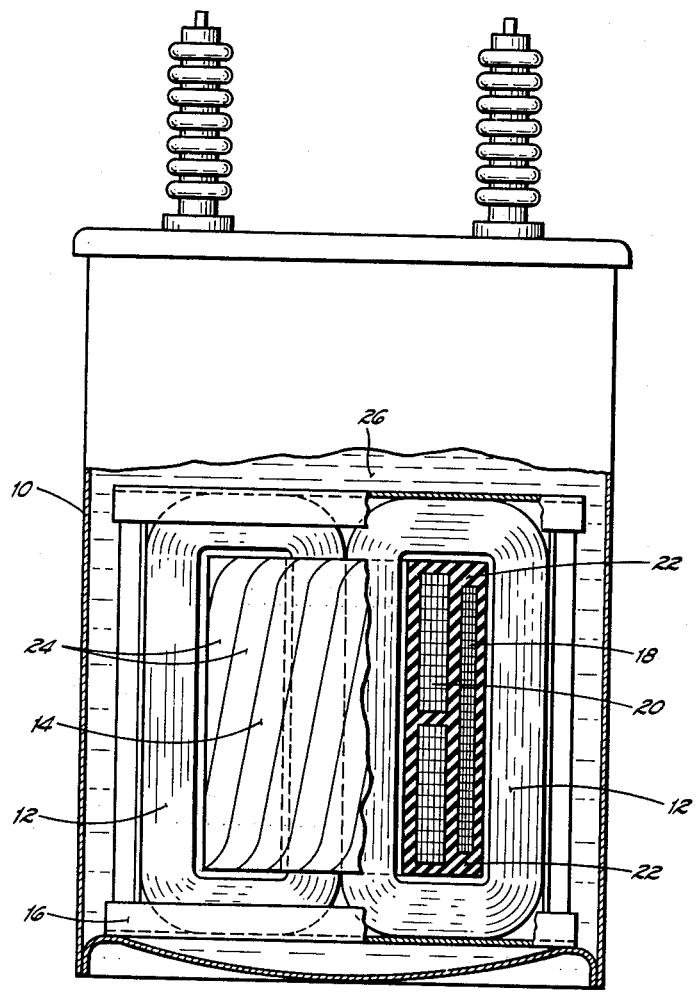
INVENTOR.
FRED S. SADLER
BY
Bernard J. Bischoff
ATTORNEY of United States Patent Office 3,135,627
Patented June 2, 1964

3,135,627
THERMALLY STABILIZED CELLULOSE MATERIALS FOR ELECTRICAL INSULATION
Fred S. Sadler, Orange, N.J., assignor to McGraw-Edison Company, Milwaukee, Wis., a corporation of Delaware
Filed Aug. 8, 1961, Ser. No. 130,014
7 Claims. (Cl. 117—143)

This invention relates generally to protecting cellulose fibres against thermal deterioration and, more particularly, to providing improved cellulose insulation materials for electrical apparatus.

Cellulose fibres tend to deteriorate when subjected to elevated temperatures for extended periods of time. This fact presents a very serious problem with respect to many applications of cellulose materials. For example, the problem is encountered in using cellulose fibre cord type reinforcing in rubber articles, such as pneumatic tires, steam hoses, conveyor belts and the like. It is also encountered in using cellulose insulation materials in electrical apparatus.

Cellulose fibre reinforced rubber articles are subjected to elevated temperatures in normal use, either from external heat, or from heat which is generated internally by reason of repeated rapid flexing, as in the case of pneumatic tires. The resultant deterioration of the reinforcing fibres is evidenced by a progressive reduction in their strength until eventually they break. This constitutes a principal cause of failure of such articles as pneumatic tires and steam hose.

As indicated above, the cellulose insulation materials which are used so extensively in electrical apparatus are also subjected to elevated temperatures in use. Here, however, the deterioration problem is increased by other factors, particularly when the insulation materials are in contact with or immersed in liquid dielectrics such as transformer oils. The reason this is true is because elevated temperatures also cause liquid dielectrics to break down into their chemical constituents, and the resultant breakdown products in turn attack the cellulose insulation materials. For this reason cellulose insulation materials in contact with liquid dielectrics generally deteriorate at a far greater rate than they would if they were not in contact with such liquids.

Accordingly, one object of this invention is to provide a method of increasing the thermal stability of cellulose fibres and cellulose fibre materials.

Another object of the invention is to increase the resistance of cellulose materials to breakdown products of transformer oil and other liquid dielectrics.

Still another object of the invention is to provide articles of manufacture embodying cellulose fibres protected against thermal deterioration.

A further object of the invention is to provide a treated cellulose insulation for electrical apparatus which when aged in oil at elevated temperatures has appreciably greater mechanical strength and thermal stability than conventional cellulose insulation materials.

A still further object of the invention is to provide cellulose insulation for electrical apparatus which will enable units of a given size to be operated at increased loads and higher operating temperatures in comparison with units of the same size which are insulated with conventional cellulose insulation materials, without a consequential loss in the life of the unit.

These and other objects and advantages of my invention will become apparent from the following detailed description when taken in conjunction with the accompanying drawing which illustrates the use of treated cellulose insulation material in an oil filled transformer.

According to the principal aspect of this invention, cellulose fibre is protected against thermal degradation by treating it with a water solution of morpholine. I have found that morpholine greatly improves the ability of cellulose fibres to withstand the deteriorating action of heat over extended periods of time.

Actually, morpholine is a liquid and it can be applied directly to the cellulose fibres as such. However, because of its extreme volatility, it has generally been found much more convenient to treat the cellulose fibres with a morpholine-containing water solution and then remove the water by evaporation.

As another aspect of the invention, the above type thermal stabilization of cellulose is improved by incorporating various additives with morpholine in the treating solution. For example, it has been found that a water solution of morpholine and a "cationic starch" will impart to cellulose fibres a greater degree of thermal stabilization than morpholine alone.

Strictly speaking, the cationic starches are starch derivatives which contain functional groups that provide a positive charge on the starch and thus attract it to the negatively charged fibres. However, it should be noted that there are many compounds which, though technically not cationic starch derivatives, resemble them in many ways. Examples of these are the cationic, water-soluble, polymeric carbohydrates sold by the Hercules Powder Company of Wilmington, Delaware under their Ceron CN trademark and grade designation as described in the United States Patent 3,070,594. These materials have been found to work very well when combined with morpholine in the aqueous treating solution. Accordingly, the term "cationic starch" as used herein shall be understood to include these other starch-like, cationic materials.

Proteins have also been found to increase the degree of thermal stabilization achieved with the morpholine treating solution. For example, when either casein or an isolated soy protein is mixed into the water solution with the morpholine, the cellulose fibres are stabilized to a greater extent than when a plain morpholine solution is used. An isolated soy protein which is especially recommended is sold by the Archer-Daniels-Midland Company of Cincinnati, Ohio, under their Adpro 410 trademark and grade designation.

It has also been found that the morpholine-protein type treating solution can be improved still further by incorporating one of the following phenolic compounds in the solution: acetyl p-aminophenol, m-cresol, phenol and p-aminophenol. In particular, a morpholine, isolated soy protein, p-aminophenol water solution is especially recommended.

According to still another aspect of this invention, I have found that the above described method of treating cellulose fibres not only protects the fibres against thermal deterioration but also stabilizes them against attack from breakdown products of transformer oil and other liquid dielectrics. For this reason, cellulose insulation materials treated in accordance with this invention are particularly well adapted for use in oil filled transformers and other similar electrical apparatus.

A transformer embodying cellulose insulation which has been treated in accordance with this invention is shown in the attached drawing. The transformer is encased within a tank 10 and consists essentially of a magnetic core 12 and a coil 14, both of which are supported in spaced relation from the bottom of tank 10 by channel support members 16 or the like. The coil 14 comprises a high voltage winding 18 and a low voltage winding 20 which are insulated from one another by the treated cellulose insulation 22. A treated cellulose wrapping 24 may also be applied to the exterior of the coil 14. A liquid dielectric 26 comprising oil, chlorinated diphenyl or the like is disposed within the tank 10 to cover the core 12 and the coil 14 in order to insulate them and to dissipate the heat generated during operation.

Actually there is some question as to just how and why the above described treating solutions stabilize cellulose fibres. Although there is definitely some interaction between the active ingredients in the solutions, the exact nature of it is not at all clear. I have found, however, that when the treating solutions are evaporated to dryness, the resulting residue is a thin, brittle sheet which if left in the open air becomes flexible after a time. This would seem to indicate that the material takes on water from the air and may explain why it works so well in stabilizing cellulose fibres.

In practicing the invention, the water solution of (a) morpholine, (b) morpholine and a cationic starch or (c) morpholine and a protein (with or without the above mentioned phenolic compounds) may be applied to the cellulose fibres in any suitable manner. Obviously the simplest way is to immerse the fibre material directly into solution or dispersion of the additives until the material is substantially impregnated. However, the solution can also be applied by spraying, brushing or by a size press addition.

It should be emphasized that in order to realize the benefits of this invention, the above described active ingredients must be actually present in the cellulose fibres when they are subjected to the heating which would ordinarily cause thermal deterioration. And generally, the greater the amount of active ingredients present, the more the cellulose fibres are stabilized. However, because several different active ingredients are used in varying proportions in the treating solution, it is difficult to provide a meaningful, quantitative indication of the degree of stabilization attained. I have found, however, that when these active ingredients are present in the fibres in an amount corresponding to 0.2–2.0% nitrogen by weight of the fibres, substantial improvement in the thermal stability of the fibres is obtained.

The concentration of active ingredients used in the treating solution may vary considerably, both with respect to the total ingredients and the individual additives. Although it is naturally somewhat more difficult to achieve the desired pick up of additives from a very dilute solution as compared to a more concentrated one, solutions containing as little as 1% morpholine have been used. Typically, however, the solutions employed contain about 7.5% by weight of active ingredients.

In treating the fibres, the solution may be at room temperature or higher, even up to its boiling point. The time of contact between the cellulose fibre material and solution should be sufficient to permit substantial penetration of the fibres. Normally times of 1 to 10 minutes are adequate for this purpose, although longer times may also be employed without adverse effect.

Although, as indicated above, the simplest way of applying the treating solution to the fibres is to immerse the fibres directly into the treating solution and although this method was used in treating the specific samples discussed hereinbelow, it is possible that, in the commercial application of this invention, some other method of treating the fibres will prove superior to the immersion method, at least for some purposes. Specifically it is felt that the size press addition method may be of greater commercial significance.

The examples given below illustrate the practice of this invention and the improved results obtained in using my treated cellulose insulation material in electrical apparatus. It will be noted that the accelerated aging tests were conducted under conditions which were intended to duplicate in so far as possible the conditions to which cellulose insulation materials are subjected during the actual operation of an oil filled transformer.

In preparing each of the samples, a sheet of electrical grade kraft paper was immersed in an aqueous solution containing the designated amounts of the additives until the paper had become thoroughly soaked or impregnated. (The protein used was Adpro 410; the cationic starch, Ceron CN which is an aminized starch containing 0.23% nitrogen.) The impregnated paper sheet was allowed to air dry at room temperature, and then it was placed in a glass tube containing a 21" piece of 16 gauge, Formvar-coated copper wire and a 14" x 1" x 2 mil strip of copper foil. This paper-copper system was dried in an oven at 135° C. for 16 hours, during which time the tube was evacuated under an absolute pressure of 0.1 mm. At the end of the drying period, the evacuated tube containing the paper and copper was filled under vacuum with an inhibited transformer oil, leaving an air space in the tube of approximately 15% of the total volume. The air space was filled to one atmosphere pressure with dry air, and the tube was then sealed off with an oxygen gas torch. This sealed glass tube containing the treated paper, coated copper wire, copper foil and transformer oil, was placed in an oven at 170° C. for five days, after which time both the heat aged sample and the control were tested for tensile strength retained. The results of these tests are summarized in the table.

| Weight Percent of Additives in Aqueous Solution | Hrs. aged at 170° C. | Percent of Original Strength Retained | Relative Strength |
| --- | --- | --- | --- |
| 0 | 0 | 100 | |
| 0 (control) | 120 | 68 | 100 |
| 100 morpholine (plain-no-water) | 120 | 88.1 | 129.3 |
| 2.5 morpholine, 1.25 cationic starch | 120 | 79.8 | 117.5 |
| 5.0 morpholine, 2.5 cationic starch | 120 | 88.2 | 129.5 |
| 5.0 morpholine, 2.5 protein | 120 | 89.5 | 131.5 |
| 5.0 morpholine, 1.25 protein, 1.25 m-cresol | 120 | 99.7 | 146.5 |
| 5.0 morpholine, 2.5 protein, 0.2 p-aminophenol | 120 | 96.5 | 143.0 |
| 5.0 morpholine, 1.25 protein, 0.50 acetyl p-aminophenol | 120 | 107.6 | 158.2 |
| 10 morpholine, 2.5 protein, 0.5 acetyl p-aminophenol | 120 | 112.5 | 165.4 |

The above table clearly illustrates the improved thermal aging characteristics of cellulose fibre materials treated in accordance with this invention.

After ascertaining the improved thermal characteristics of the treated paper, tests were also conducted to determine the compatibility of the treated material with other elements of the transformer system. These tests clearly established (1) that the breakdown strength of the insulating paper is not affected by the treatment and (2) that the acid value and moisture content of oil used in conjunction with the treated insulation material is actually less than that of oil used with unmodified kraft paper. In addition, interfacial tension tests which were run on oil showed that the treated material had no effect on its interfacial value. This indicates that the treating material did not contaminate the oil and that it was therefore not dissolved by the oil from the paper.

A principal advantage of using my treated cellulose insulation material in a transformer of the type illustrated is that it extends the useful life of the unit for a given transformer loading. Stated another way, this insulation permits a given size unit to be operated at higher loads and temperatures.

Although the invention has been described specifically in regard to treating cellulose insulation materials, it is to be understood that the invention also embraces stabilizing other forms of cellulose fibre materials.

While but a single embodiment of the invention has been illustrated and described, many modifications and variations thereof will be obvious to those skilled in the art, and consequently it is intended in the appended claims to cover all such modifications and variations which fall within the true spirit and scope of the invention.

I claim:

1. A cellulose electrical insulating material for use at elevated temperatures having improved thermal stability, comprising a base consisting of cellulose fibers impregnated solely with morpholine, the dry impregnated fiber base having a nitrogen content in the range of 0.2% to 2.0% by weight of the fibers.

2. A method of increasing the thermal stability of cellulose fiber material subjected to elevated temperatures when used as an electrical insulating material, comprising impregnating cellulose fibers with the combination of morpholine and a substance selected from the group consisting of a protein and a cationic starch, said combination having at least two parts by weight of morpholine to one part by weight of said substance, and combining said combination with the cellulose fibers to provide an impregnated fiber material having a nitrogen content of 0.2 to 2.0% by weight.

3. A method of increasing the thermal stability of cellulose fiber material subjected to elevated temperatures when used as an electrical insulating material, comprising admixing an amount of a substance selected from the group consisting of a protein and a cationic starch with a substantially greater amount of morpholine to provide a treating composition, and combining the cellulose fibers with said composition to provide an impregnated fiber material having a nitrogen content of 0.2% to 2.0% by weight of said fibers.

4. A cellulose electrical insulating material having improved thermal stability and subjected to elevated temperatures in service, comprising a cellulose fiber base impregnated with the combination of morpholine and a substance selected from the group consisting of a protein and a cationic starch, said combination having at least two parts by weight of morpholine to one part by weight of said substance the dry impregnated fiber base containing from 0.2 to 2.0% by weight of nitrogen.

5. A method of increasing the thermal stability of cellulose fiber material to be used as an electrical insulating material, comprising impregnating the cellulose fibers with an aqueous solution of the combination of morpholine, a substance selected from the group consisting of a protein and a cationic starch and a phenolic compound selected from the group consisting of acetyl p-aminophenol, m-cresol, phenol and p-aminophenol, said solution containing at least two parts by weight of morpholine to one part of said substance and at least four parts by weight of morpholine to one part of said phenolic compound, combining said combination with the cellulose fibers, and thereafter evaporating the water from said solution to provide a dry impregnated cellulose fiber material containing from 0.2 to 2.0% by weight of nitrogen.

6. A cellulose electrical insulating material having improved thermal stability for use at elevated temperatures, comprising a cellulose fiber base impregnated with the combination of morpholine, a substance selected from the group consisting of a protein and a cationic starch and a phenolic compound selected from the group consisting of acetyl p-aminophenol, m-cresol, phenol and p-aminophenol, said combination containing at least two parts by weight of morpholine to one part of said substance and at least four parts by weight of morpholine to one part of said phenolic compound, said impregnated fiber base having a nitrogen content in the range of 0.2 to 2.0% by weight.

7. A cellulose electrical insulating material having improved thermal stability and adapted to be used at elevated temperatures, comprising a cellulose fiber base impregnated with the combination of morpholine, a protein and p-aminophenol, said combination containing at least two parts by weight of morpholine to one part of said protein and at least four parts by weight of morpholine to one part of p-aminophenol, said impregnated fiber base having a nitrogen content in the range of 0.2 to 2.0% by weight.

References Cited in the file of this patent

UNITED STATES PATENTS

| | | |
|---|---|---|
| 2,572,808 | Jackson | Oct. 23, 1951 |
| 3,017,294 | Meisel | Jan. 16, 1962 |

FOREIGN PATENTS

| | | |
|---|---|---|
| 554,747 | Canada | Mar. 18, 1958 |
| 565,860 | Canada | Nov. 11, 1958 |
| 775,520 | Great Britain | May 22, 1957 |

OTHER REFERENCES

Poor: "Substitutes for Non-Fibrous Chemical Raw Materials," The Paper Industry and Paper World, July 1943, pp. 380 and 381 relied on.

Reineck et al.: "The Fading of Groundwood by Light," Paper Trade Journal, vol. 121, No. 20, TAPPI section, pp. 193–196.

Gregory: Uses and Applications of Chemicals and Related Materials, Reinhold Publishing Corp., N.Y., 1939, page 398 relied on.

Gregory: Uses and Applications of Chemicals and Related Materials, Reinhold Publishing Corp., N.Y., 1939, pp. 157 and 158 relied on.